Nov. 5, 1968

D. F. WINNEK 3,409,351

COMPOSITE STEREOGRAPHY

Filed Feb. 7, 1966

INVENTOR.
DOUGLAS F. WINNEK
BY
Robert S. Dunham
ATTORNEY

Nov. 5, 1968

D. F. WINNEK 3,409,351

COMPOSITE STEREOGRAPHY

Filed Feb. 7, 1966

INVENTOR.
DOUGLAS F. WINNEK
BY
Robert S. Dunham
ATTORNEY

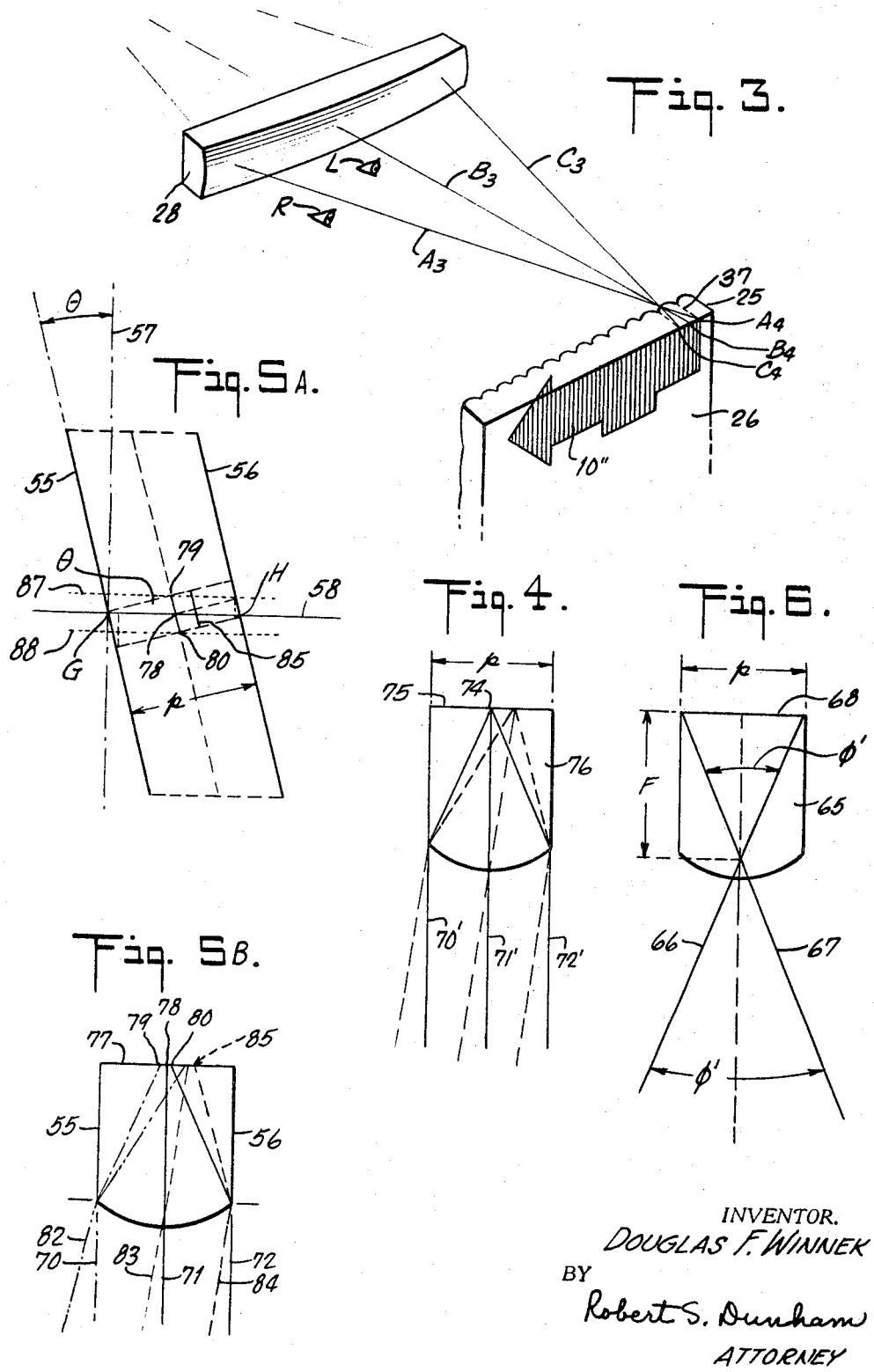

INVENTOR.
DOUGLAS F. WINNEK
BY
Robert S. Dunham
ATTORNEY

Nov. 5, 1968   D. F. WINNEK   3,409,351
COMPOSITE STEREOGRAPHY
Filed Feb. 7, 1966   5 Sheets-Sheet 5
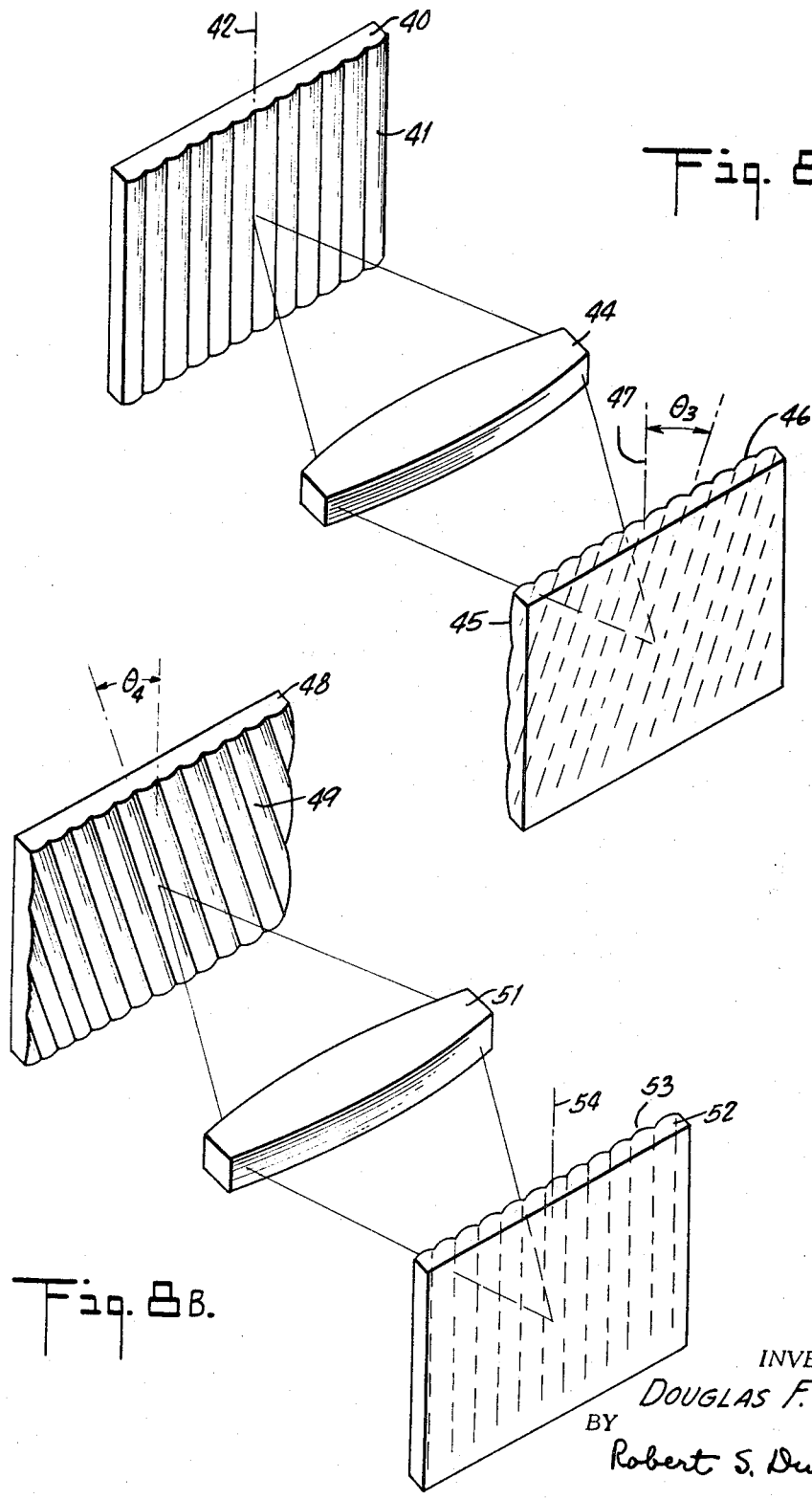
INVENTOR.
DOUGLAS F. WINNEK
BY
Robert S. Dunham
ATTORNEY 3,409,351
    COMPOSITE STEREOGRAPHY
    Douglas F. Winnek, 544 Lowell Ave.,
          Palo Alto, Calif. 94301
    Filed Feb. 7, 1966, Ser. No. 525,572
         15 Claims. (Cl. 353—7)

This invention relates to composite stereography and more particularly to methods and apparatus for producing composite stereographs by projection from such stereographs. In a special sense, the invention is directed to novel procedure and systems for photographic production and reproduction of composite stereographs, notably to achieve, by projection, a stereograph wherein the reproduced scene or other object, associated in such reproduction with an adjacent lenticular screen, is characterized by true and effective stereoscopic attributes, i.e. so that when viewed through the screen, the object is seen as if in three dimensions, with properly stereoscopic relief.

In certain particularly useful embodiments, the invention is concerned with the production of stereoscopic prints by operations which include first making a pseudoscopic negative with a camera of appropriate character, and reproducing stereoscopic prints from such negative by optical projection, important novel features of the invention residing in the projection operation and indeed cooperatively in desired cases, in making the original pseudoscopic negative.

Certain basic principles of composite stereography, including means and methods for making pseudoscopic negatives, are described in my United States Patent No. 2,562,077, granted July 24, 1951, for Composite Stereography, to which reference is made for an understanding of stereographic reproduction employing lenticular films, and for an understanding, or further understanding, of certain terminology that may be employed herein. Indeed the nature of pseudoscopic and stereoscopic pictures, and of lenticular screens, and their effects, as utilized in and with such stereographs, are believed to be well explained in the cited patent, as likewise related features and terminology, including the constitution of stereographs as comprising picture components and aspect elements, various relationships of viewing angles, aspect angles, and the like, being also discussed in the patent.

A notably important object of the present invention is to provide new methods and apparatus, for obtaining reproduced composite stereographs, especially photographic prints associated with an appropriate lenticular screen and constituting a true stereoscopic reproduction. A further object is to provide for such reproduction of composite stereographs by a relatively simple projection operation, suitable for rapid work with a minimum of manipulative steps, thereby achieving efficiency and economy, while permitting attainment of highly satisfactory stereoscopic prints, with definition and with an ample range of possible viewing angles, as desired for superior realization of the stereoscopic effect. In attaining these objects, the invention is related to known procedures whereby stereographs have been satisfactorily obtained as photographs or other still pictures, by employing so-called wide-lens or scanning techniques in the camera. As will be appreciated, lenticular or equivalent screens are employed for resolving the ultimately observed image or imprint into aspect elements which are individually seen by the respective eyes of the observer.

It will be understood that while a three dimensional effect can be obtained with stereoscopic systems that simply involve a single right-eye view and a single left-eye view, such systems are of limited practical value, especially if designed to dispense with local viewing devices that the viewer must hold next to his eyes. In particular, in those systems, a viewer can only see a picture properly from essentially one position relative to the optical axis of the picture, e.g. such axis being a line perpendicular to the surface of the picture. Furthermore, with only two, single views respectively serving the observer's two eyes, the stereograph lacks any effect of motion or displacement, which is a somewhat minor but significant part of the three dimensional effect that is achieved with normal binocular vision.

That is to say, in looking at a natural scene the perception of depth is aided by sidewise movements of the viewer or his head which produce corresponding relative displacement of objects at different distances and which thereby contribute to the positional identification of such objects. In preferred embodiments of the present invention the stereoscopic presentation in the ultimate photographic print (as indeed, also pseudoscopically in the negative) is of a so-called laterally continuous type in that within a convenient range the observer may move somewhat from side-to-side, i.e. looking from successively different angles, so that he not only obtains a full stereoscopic view by seeing the objects as if from different angles respectively with two eyes, but also perceives relative displacement of near and far objects in the observed scene.

Although the methods and systems herein described may have application in the limited provision of simple two-element viewing, and indeed afford considerable improvement in such cases, a highly significant feature of this invention is related to the more complete type of composite stereoscopic presentation, explained above.

A composite stereograph of the multiple aspect type essentially consists of a lenticular or other component-resolving screen behind which the viewed picture is divided into image components corresponding to the elements of the screen, such component being in effect constituted by a multiplicity of "aspect elements" representing minute elements of the depicted object as viewed from respectively different aspects or angles. Thus, for example, the screen may be a transparent film provided with a multitude of parallel contiguous vertical ridges facing outwardly and each having the characteristics of a cylindrical lens; i.e. a surface curved about a vertical axis. Hence the observer's eye looking at such a screen from a given angle sees in effect only a very narrow area of the rear face of the screen behind each lenticulation, and as the area of observation is changed, different narrow, linear regions behind the respective lenticulations (being other aspect elements), come into view.

As will now be understood, the image or imprint applied to the rear face of the screen is thus designed to provide a multiplicity of fine, parallel aspect elements, extending vertically in alignment with the axis of the lenticulations, and such as to constitute respectively the elements of a viewed object or scene as perceived from a corresponding multiplicity of different angles or aspects. Each upright lenticulation is thus considered to define a single component of the picture, i.e. behind the lenticulation, such component being divided in effect into a number of correspondingly narrower aspect elements, each representing the same component of the picture as seen from a different angle of view.

As will now be seen, the establishment of the desired image is very preferably achieved by originally viewing the object from a multiplicity of angles, i.e. over a lateral distance substantially greater than the so-called normal pupillary distance, which is, for example, the average distance of about 2½ inches between the eyes of the observer. With the scene viewed from a multitude of angles, preferably corresponding to at least two pupillary distances and very preferably several, so as in effect to afford a corresponding multitude of images from different aspects, and with the picture behind the viewing screen considered as divided into upright image components respectively corresponding to the lenticulations of the screen, each component must consist of a multiplicity of very narrow, upright aspect elements arranged side by side in the space behind each lenticulation. The order of these minute strip-like aspect elements being appropriately established, in correspondence with the order of original viewing of the object from respectively adjacent angles, an observer looking at the lenticular screen sees appropriately different aspects with his right and left eyes, and indeed sees different pairs of such aspects from different points of observation relative to the screen. Thus the stereoscopic effect is achieved over a corresponding range of positions.

Although scanning cameras or other special cameras can be employed, a so-called wide-lens camera, as described in my aforesaid patent, provides convenient means for simultaneously viewing and recording a multitude of images from different aspects, i.e. on a sensitized photographic surface covered with a lenticular screen. In this system, however, as indeed in some scanning camera systems, the lens reverses the order of the aspect elements within each picture component, when such elements are converged into and by the lenticular screen on the negative photographic film. The result is that the picture as thus taken is in reverse relief, i.e. of so-called pseudoscopic character, when viewed.

In order to obtain prints or other reproductions of the stereographic negative, difficulties arise by reason of the presence of the lenticular screens adjacent the negative and positive photographic surfaces respectively, and also, where the negative is pseudoscopic, in converting the ultimate image into true stereoscopic arrangement, i.e. reversing the order of aspect elements behind each lenticulation. Direct contact printing is not feasible unless the lenticular screens are separated from the photographic films or sheets, and in the latter case serious difficulties arise in effecting registration of the screen with the reproduced image, and such difficulties are heightened if enlargement or reduction of the image is desired.

Although it is apparent that on projecting an image from one stereograph, i.e. by direct optical projection, to a surface covered with a lenticular film, a reversal of the order of aspect elements is attained (so as, for example, to convert from pseudoscopic to stereoscopic), other serious problems arise. Certain methods and apparatus for overcoming them are described and claimed in my aforesaid patent, but the present invention is directed to new and simplified operations, having unusual convenience in use and adaptability to a variety of circumstances and results.

The major difficulty heretofore encountered in direct optical projection from a stereographic object (comprising a lenticular screen and an associated picture, whether pseudoscopic or stereoscopic) resides in certain unwanted patterns or images appearing in the projected reproduction, i.e. as projected onto the receiving surface through the lenticular screen that is superposed upon it. Thus when the image of a grating, for example, is projected upon another grating parallel to the first, the dissimilarity of frequency, if any, produces a visible overlying interference pattern which appears as a new grating, having a pitch or frequency mathematically related to the pitch of the receiving grating and that of the image of the grating at the source. Such interference pattern will at least appear as parallel lines wider apart than either the lines of the receiving grating or the lines of the image of the originating grating. Where the gratings are lenticular screens the originating screen results in an image, of the grating type, in addition to the image of the underlying picture or object, and thus gives rise to the stated interference patterns. Any slight warp or localized or generalized non-linearity in either of the screens will produce an image, on the photographic surface, that has a so-called moire appearance; indeed these effects, well known in the art of photography with lenticular screens, have become generally identified as moire patterns or effects, meaning any and all such interference patterns of the sort described.

It will thus be apparent that in attempting simple direct projection from one stereograph having a lenticular screen to a print surface also carrying such screen, these moire or interference patterns are photographed by the sensitized surface, and appear in the ultimate print, so that the produced photograph, either carrying the moire design or something similar, or at the very least appearing as a scene observed through jail bars, is greatly degraded in quality, and indeed useless.

As intimated above, the present invention is designed to afford means and procedure of still photographic projection or the like (conveniently including a projection printer having a wide lens) whereby moire or other unwanted patterns are avoided in the ultimate print. A further and particularly important feature is that the invention provides for the projection of clear and sharp stereoscopic prints of any desired image ratio on a lenticular print sheet, i.e., whether enlarged or reduced from the size of the negative, or whether of the same size. It is also highly significant and of special convenience that the number of lenticulations per inch of the screen embodied with the print material need not bear any relation to the number of lenticulations per inch in the negative. Alternatively, if preferred, the number of lenticulations per inch on both materials may be identical, and indeed the materials may be completely identical, all without regard to the image ratio (i.e., the ratio between image and object) that is employed.

These and other advantages will become further apparent from the following disclosure of the invention, especially in connection with the description and the accompanying illustration of certain presently preferred embodiments.

Referring to the drawings:

FIG. 3 is a perspective diagram, further illustrating a part of the operation in FIG. 2;

FIG. 4 is an optical diagram, showing certain relationships of light rays in a lenticulation, viewed as if on a section perpendicular to its longitudinal axis;

FIGS. 5A and 5B are diagrams illustrating optical paths in a lenticulation disposed at a bias angle to the viewing axis, FIG. 5A being a vertical view and FIG. 5B a horizontal view;

FIG. 6 is an optical diagram showing certain angular relationships of viewing angles accommodated by a single lenticulation, showing similarly to FIG. 4;

Figure 2:
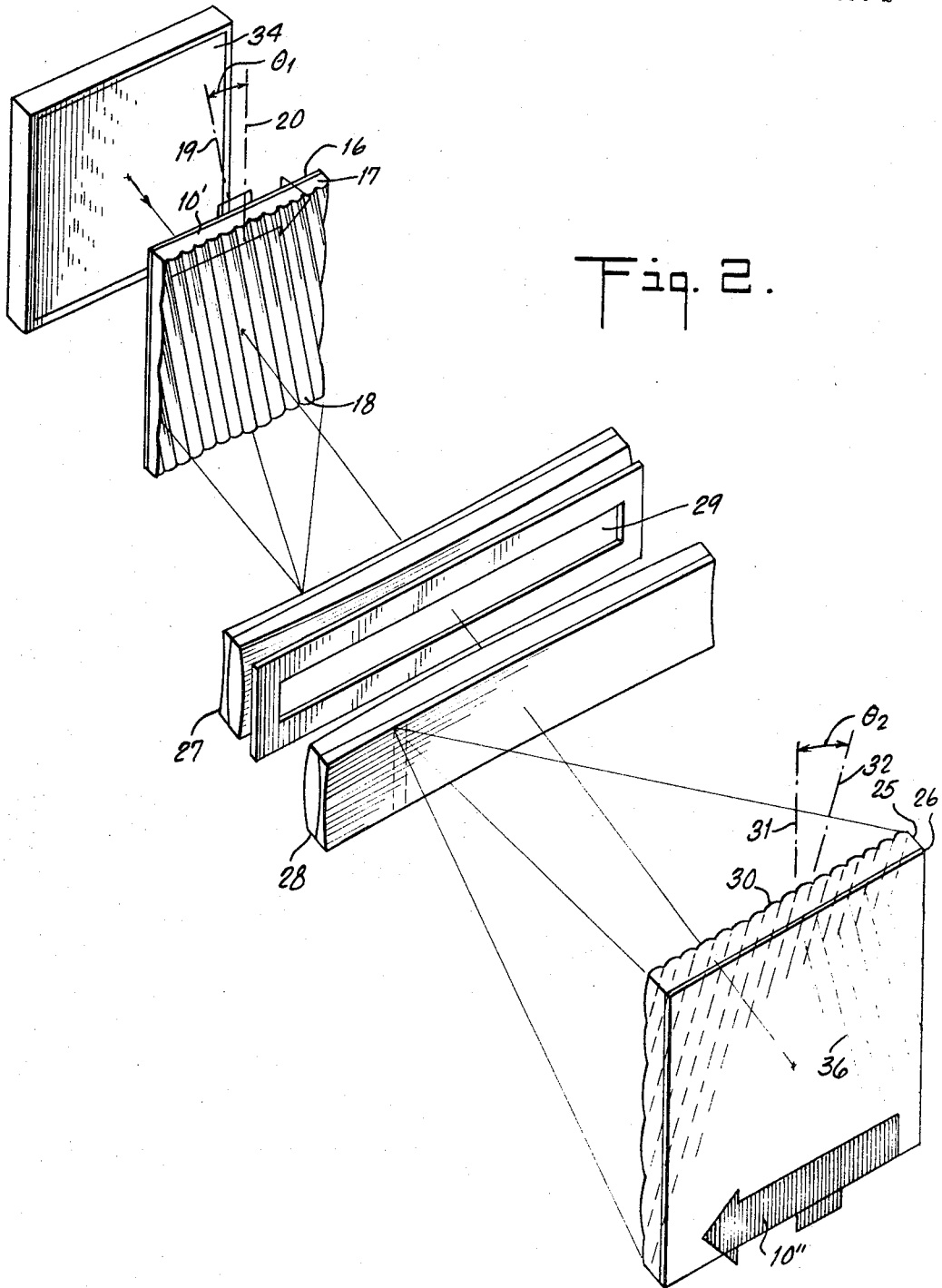
FIG. 2 is a perspective diagrammatic view, in accordance with the same embodiment of the invention, showing projection printing of a composite stereograph that has been produced as in FIG. 1.
Figure 7A:
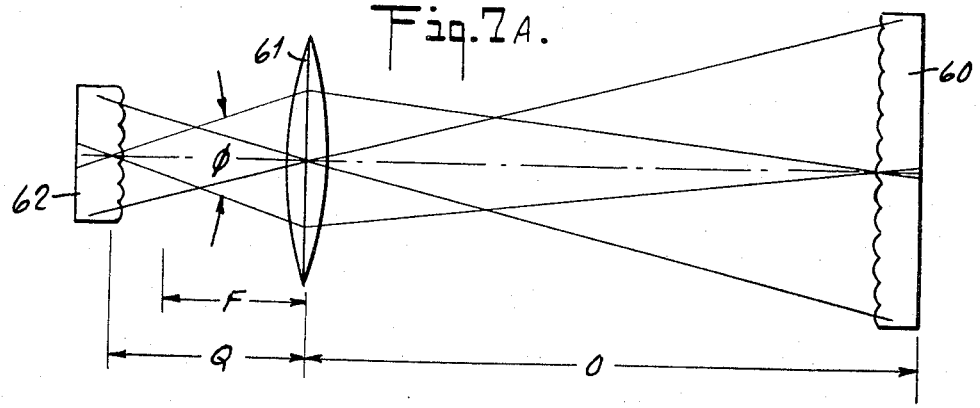
Figure 7B:
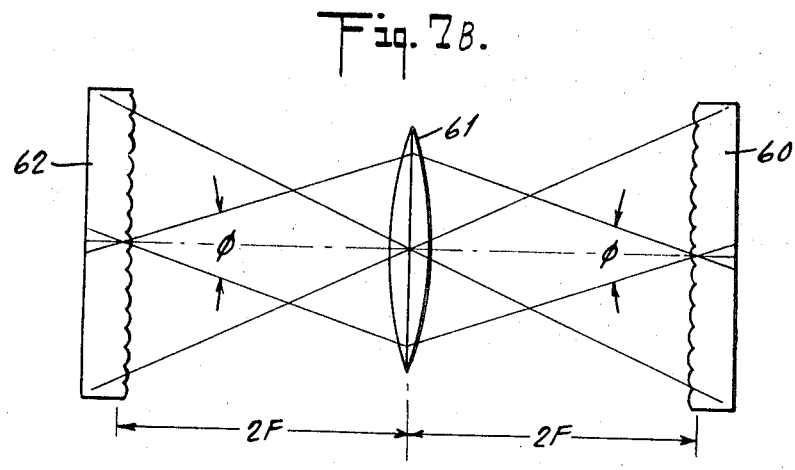
Figure 7C:
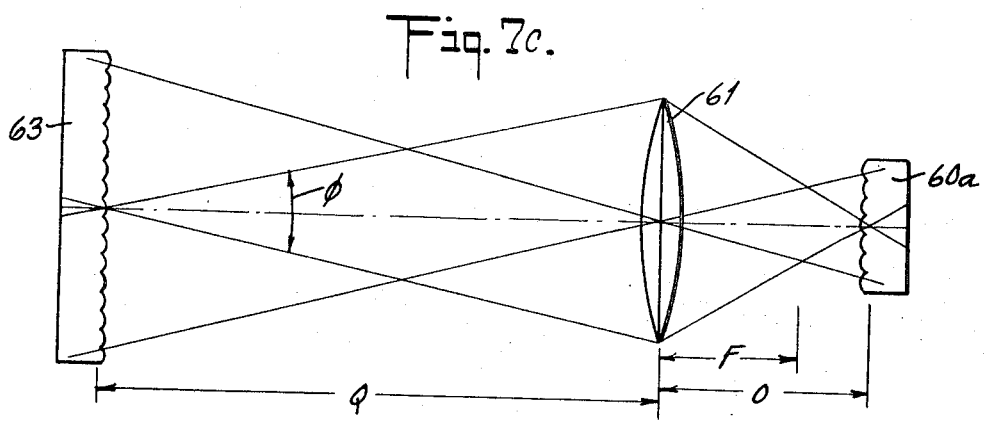

FIGS. 7A, 7B and 7C are diagrammatic plan views, further simplified, of projection systems or operations as in FIG. 2, showing prints produced respectively as a reduction, a one-to-one reproduction, and an enlargement, of a composite stereographic negative; and FIGS. 8A and 8B are simplified diagrammatic views similar to FIG. 2, but showing other angular relationships of the lenticular screens adjacent the negative and print surface respectively.

The methods and apparatus of the invention as set forth in the drawings are intended for embodiment in photographic systems utilizing components otherwise of known character, as for example utilization of projection printing equipment adapted for producing positive prints by enlargement, reduction or one-to-one transfer. In the original camera operation, suitable wide lens equipment may be employed, with appropriate horizontal and vertical aperture adjustments, as for example of the nature described in my aforesaid patent. As will be explained hereinbelow, appropriate wide lens means with aperture adjustments are also employed in the printer, it being understood that the aperture in both cases is generally of a long horizontal type, relatively narrow in the vertical direction. Appropriate shutter and shutter controls are used in both camera and printer, and may be of any appropriate design, based on known principles, and therefore need not be illustrated and described in detail.

Indeed it will be understood that various negative and printing emulsions (e.g., in color and black and white), conventional processing, and other appurtenances usual for cameras and projection printers, may be employed in accordance with known or hereafter adopted practices of the art, regardless of indication or absence of indication of such features herein. Thus, for example, it may be assumed that normal exposure techniques in both operations (including lighting and placement of the object in making the original negative), normal film and print processing, and other image quality controls can be utilized in producing the original pseudoscopic negative and the ultimate stereoscopic print.

In accordance with the present invention it has been discovered that unusually satisfactory results in projection printing or the like, with respect to composite stereographs having a predetermined viewing axis (such as the conventional vertical axis across which the eyes of the observer extend horizontally in normal viewing position) may be achieved by so circumstancing the photographic steps, e.g. at least the projection printing step or indeed in many cases the camera step as well, that in the projection the lenticular screens respectively associated with the object or negative and the image or print, have their lenticulations at an angle of bias to each other. That is to say, for instance, assuming that the viewing axis is considered to be vertical, the lenticulations of one or both of such screens are disposed at an acute angle to such vertical direction, the major criterion being that longitudinal boundaries (or longitudinal axes) of such lenticulations form an angle to each other which falls within a significant range, critically the range from 10° to 60°. In a special sense the invention is directed to operations such that in projection printing, the bias angle between the lenticulations of the two screens is selected in a range from a minimum of 12° to a maximum of about 50°. For many purposes, convenience is served, as well as certain advantages of optical character, by utilizing a small bias angle in each of the screens, i.e. an angle of bias to the viewing axis, in such direction that the sum of these bias angles represents a total angular displacement between the sets of lenticulations respectively associated with object and image. Thus for instance the lenticulations in each screen may be disposed at an angle of 7½° to the viewing axis, whereby the total bias in projection printing is 15°, a value found particularly suitable in achieving the desired results while maintaining optimum optical characteristics of relief or three dimensional effect. In such situation, the original object is photographed in the camera with a negative film or like material carrying a lenticular screen at the stated angle of 7½° to the viewing axis, e.g. the vertical axis desired for the camera operation to attain a range of aspect angles transversely or horizontally of such viewing axis.

Alternatively, either the negative or the ultimate print may carry lenticulations aligned in parallelism with the viewing axis, so that only the other of the lenticular screens incorporates an angle of bias for its lenticulations, e.g. 15°, or in a range up to about 35°.

A particular feature of the invention is the substantial criticality of the angular relationship of the disposition of the lenticulations as generally described above. Thus for instance, it appears that highly undesirable defocusing or impairment of stereoscopic characteristics, as well as other defects, tend to arise where either of the lenticular screens in the projection operation is characterized by an excessive bias angle relative to the viewing axis, and likewise where the total bias angle between the two screens is excessive. It appears that the total angle, last mentioned, should not be greater than about 60°, and while in some instances the bias angle for one screen alone (where the other has essentially no bias angle) may sometimes be as much as 45°, results are very markedly superior in most cases where the angle is not more than about 35°. Indeed, according to present experience and understanding, the total bias angle for truly satisfactory practical results should not be more than about 30° between the two screens, with neither angle greater than about 25°.

By operations, including projection printing performed in the manner now described and with the defined angular relationships of screen lenticulations, excellent reproduction of composite stereographs can be attained with avoidance of moire or other undesirable pattern effects. At the same time good definition in the projected image is achieved and likewise good provision for stereoscopic characteristics, over a desirable range of viewing angles, in the ultimate print. Assuming that the photographic negative, constituted as a stereograph, is pseudosopic, the direct projection system using a wide lens or equivalent optical means yields a true stereoscopic character to the print, thus achieving the conversion, usually desired, of pseudo to stereo.

Figure 1:
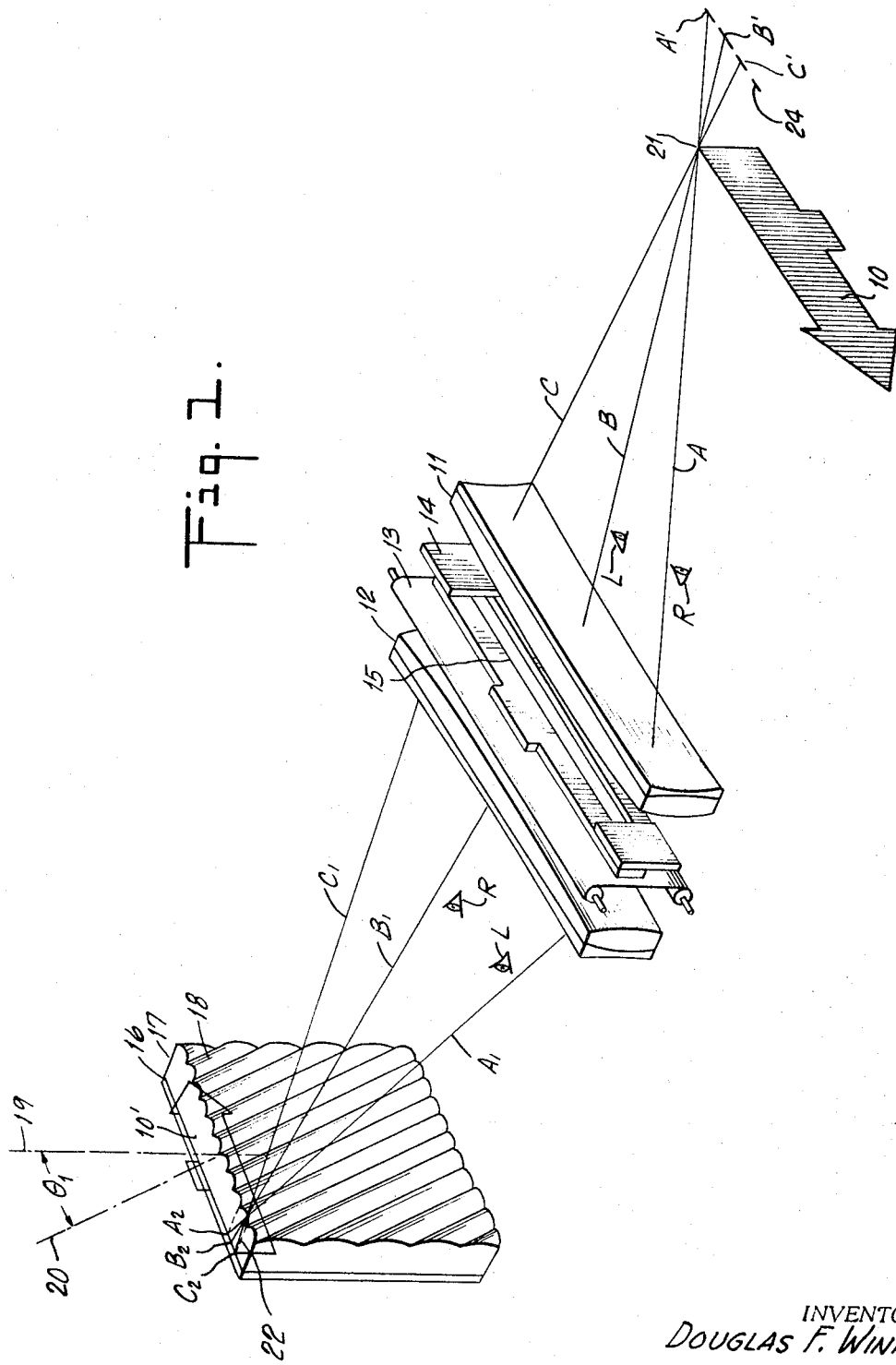
FIG. 1 is a perspective diagrammatic view showing photographic recording of a composite stereograph, in accordance with one embodiment of the invention.

FIG. 1 shows essential parts of a camera system for taking a pseudoscopic negative from a scene or other object, simply indicated as the arrow 10, it being understood that the distances of object and negative surface from the lens system are not drawn to scale, the distance of the object 10 being greatly reduced for convenience of illustration. The camera can be essentially similar to that disclosed in my above-mentioned Patent No. 2,562,077, reference being chiefly had to FIG. 1 and related views in the latter. Thus the camera lens may be of horizontally wide aperture, consisting, for example, of a pair of spaced achromats 11, 12, between which there is a suitable shutter 13 and a horizontal slit mechanism 14 having appropriate means for adjusting the vertical width and horizontal length of the opening. As will be noted, the taking lens or combination of lenses need not be of complete circular shape, but indeed is preferably a long horizontal segment, designed to accommodate a plurality of viewing angles while preserving appropriate depth of focus by the limitation of vertical narrowness of the slit 15 in the slit means 14.

The image of the object 10 is received on a layer of photographic emulsion or other sensitive material 16, applied, conveniently directly, to the rear face of a transparent film sheet 17 of conventional material which is embossed or otherwise provided with lenticular ridges 18, so that the sheet 17 constitutes the desired lenticular screen.

As will be appreciated, the viewing axis of the camera system in FIG. 1 is vertical, and the lenticulations 18 (in this embodiment of the invention) are arranged at a preferred angle $\theta_1$ of bias, here shown with some exaggeration as such angle between the vertical viewing axis 19 and the longitudinal lenticulation axis 20. For instance the angle $\theta_1$ can be 7½°.

As will be understood, particularly from FIG. 1 of my above-mentioned patent, the camera lens 11–12 and slit 15 are designed to observe the object 10 from a multiplicity of aspect angles e.g. preferably as if viewed from more than one pupillary distance, and indeed very preferably as viewed from two or several pupillary distances crosswise of the lens. In accordance with known principles, rays A, B and C may be taken to represent different aspects of a single point 21 of the object, all of these being brought to substantial focus at the receiving negative structure 16–17, e.g. as illustrated by the corresponding converging rays $A_1$, $B_1$ and $C_1$. By the action of the lenticulation indicated in plan at 22 corresponding aspect elements $A_2$, $B_2$ and $C_2$ are registered on the photographic emulsion 16 at the rear face of the lenticulation, being thus focused at separate points, generally crosswise of the lenticulation, by reason of its cylindrical lens characteristics.

The three dimensional effect of viewing the object from various aspect angles is shown by projection of the rays A, B and C as if they had come from a plane 24, more remote than the object 10, i.e. beyond the corner 21 of the latter. Thus these rays, and corresponding lines of sight, can be considered as coming from the horizontally spaced points A', B' and C' in the plane 24. When the image 10' of the object, inverted as shown, is developed in the emulsion 16, being then in a negative representation, it may be viewed through the lenticular screen 17 in such fashion that different viewing angles will present different aspect elements, as $A_2$, $B_2$ and $C_2$, within each picture component corresponding to a lenticulation. As will also now be understood, the negative 10' is pseudoscopic, with the order of aspect elements within each component being reversed from the order shown in the plane 24 as apropriate for true three dimensional depiction. For instance, if rays A and B are taken as viewed by the right and left eyes respectively of an observer, like observation of the finished negative will reveal aspect element $B_2$, along ray $B_1$, to the right eye, and aspect element $A_2$, along ray $A_1$, to the left eye.

Although the lenticular ridges 18 are disposed at the bias angle $\theta_1$, they nevertheless afford substantial lateral differentiation in accordance with the principles explained in my cited patent, i.e. to provide the desired separation of aspect elements at the rear of the screen 17. While vertically successive points constituting, in effect, the vertical aspect element line will be related to a series of angularly disposed lenticulations between the top and bottom of the stereograph, the optical result is substantially the same, i.e. in that in general, rays striking the screen surface at a given angle will be brought to focus in such position as to be viewed from that angle, whether such focusing is accomplished by one lenticulation or another or partly by one lenticulation or partly by another. Hence upon suitable processing, a composite stereograph, being a pseudoscopic negative of the object 10, appearing as the reproduction 10', is obtained, with essentially full stereographic properties providing the bias angle $\theta_1$ is not excessive.

Turning now to FIG. 2, projection printing is effected in accordance with the invention from the described psuedoscopic negative composed of the developed emulsion 16 and the lenticular film or screen 17. The projection printing is directed to a like stereographic element comprising a lenticular screen 25 backed by a photographically sensitive emulsion 26. A suitable projection lens, which may be of any desired simple or compound character and is here conveniently illustrated as a pair of spaced achromats 27, 28, is utilized to project an image of the negative 16–17 to the positive print structure 25–26. It will be appreciated that other projection means may be employed, including scanning lens systems or appropriately figured mirrors or like optical arrangements, but lens systems of the sort shown are relatively convenient and usually preferable. The light path may be precisely defined by a long horizontal slit, e.g. as shown at 29 between the lens elements, the slit forming structure conveniently having a suitable adjusting means (not illustrated), similar to the element 14 in FIG. 1.

In print sheet structure 25–26, the lenticular ridges 30 are, in this embodiment, disposed at a bias angle $\theta_2$, to the viewing axis 31 of the print, such angle being illustrated between the latter line and line 32 representing the longitudinal axis of a lenticulation. The transparent film 25 is thus arranged so that the bias angle $\theta_2$ extends in an opposite direction from the vertical axis 31, in respect to the corresponding bias angle $\theta_1$ between the axis 20 and the line 19 of the negative. In other words, the total bias angle between the lenticulations of the negative and positive is equal to the sum of $\theta_1$ and $\theta_2$. If $\theta_2$ is also exemplified as 7½°, the complete bias angle is 15°, completely effective for the purposes. As will be appreciated, the negative 16–17 and positive 25–26 are disposed at suitable distances from the lens structure 27–28, so as to project an image of the desired size, and suitably in focus, on the photographic surface 26. For operation, the negative may be illuminated by a suitable diffuse light source, indicated at 34 and arranged for directing light to and through the negative picture 16. The lens system 27, 28, and slit 29 are constituted similarly to the camera lens, representing in effect a long horizontal segment of a wide lens with the light path restricted to a horizontally elongated, vertically narrow opening, of the slit 29.

With the negative 16 suitably illuminated by the light source 34, images of its aspect elements are projected on the sensitized surface 26, i.e. by the aid of the optical system constituting the lenticulations 18, the lens 27–28, and the lenticulations 30. The image 10" of the original object, is now upright and constitutes, when the print is developed, a positive print or reproduction of the original object 10. With this arrangement, it is found that there are not moire or other objectionable patterns produced in the positive stereograph. The theoretical image of the negative screen 18 is shown in angular, parallel dotted lines at 36 on the emulsion 26, but because of a crossing relation of this image to the lenticulations 30, no appreciable interference effects are produced. At the same time, the image 36 of the negative lenticulations is essentially so faint or diffused as to be inconsequential, and indeed is not seen in the ultimate print.

As illustrated in FIG. 3, the projection system converts the pseudoscopic picture of the negative to a true stereoscopic picture in the positive. Thus rays $A_3$, $B_3$ and $C_3$, representing different aspect views, are differentially brought to focus in the emulsion 26, i.e. behind a given lenticulation 37, at points $A_4$, $B_4$ and $C_4$. These latter points thus represent aspect elements of a single picture component, corresponding to the point 21 of the original object 10 (FIG. 1). By comparing FIG. 3 with FIG. 1 and bearing in mind that the projection lens system including its element 28 functions generally in a similar manner to the reverse of the camera lens 12–11 of FIG. 1, it will be noted that the order of the aspect elements is now reversed in the print surface 26, relative to the corresponding aspect elements $A_2$, $B_2$ and $C_2$ of the negative. Hence if the positive print, after development, is to be viewed, the aspect element $A_4$ becomes a right eye view along the ray $A_3$ and aspect element $B_4$ becomes a left eye view along the ray $B_3$. In other words, the print is a true stereoscopic stereograph, with the right and left eyes observing the same aspects as in observation of the original object 10 (FIG. 1).

Although the lenticulations of the print screen 25 are disposed at a bias angle, the differentiation of aspect elements within picture components is nevertheless achieved, providing the angle is not excessive, in the same fashion as explained above respecting the negative stereograph 16–17. The finished print is therefore a satisfactory stereograph, exhibiting stereoscopic effects when viewed from a suitable distance, and may afford such observation over a desirable range of viewing angles, comparable to the range comprehended by the original camera operation. Thus the effects of binocular observation and also effects of relative movement between near and far planes in the picture, are fully attainable, preferably over lateral positions of the observer's eyes along a space of more than one pupillary distance, and very preferably at least two or more pupillary distances.

In the operations of FIGS. 1 and 3, as explained above, the lenticulations are disposed at a bias angle, e.g. 7½°, in each of the negative and positive stereograph sheets. This arrangement is of considerable convenience in a practical sense, requiring a medium average bias angle for the image receiving step in each operation, and affording a common arrangement of lenticulations in the photographic material used for negative and positive purposes. As will be noted, the bias is actually in the same direction for the elements 16–17 and 25–26 (FIG. 2) when these stereograph sheets are disposed side-by-side, although when arranged face-to-face for the projection operation their bias angles run oppositely in order to provide the total preferred minimum of 15°.

Alternatively the bias angles of the two sheets may differ, or one of them may have no bias angle at all, i.e. in that the lenticulations run parallel to the viewing axis and thus parallel to the side edges of rectangular pieces of photographic material. For illustration, FIG. 8A shows a highly simplified diagram of projection printing where the negative stereograph 40, has its lenticulations 41 arranged parallel to the viewing axis 42, such negative having been made by a camera operation of the sort shown, for example, in FIG. 1 of my aforesaid patent No. 2,562,077. The picture and its aspect elements are projected by the wide lens 44 to the positive print sheet and screen 45 wherein the lenticulations 46 are disposed at a bias angle to the viewing axis 47, e.g. an angle $\theta_3$ of 15°. Under such circumstances effective stereoscopic prints are produced, essentially in the same way and with the same basic advantages as in the operation of FIG. 2. In FIG. 8B the pseudoscopic negative stereograph 48 has its lenticulations 49 at a bias angle sufficient to accomplish, in itself, all of the desired results in projection printing, e.g. an anle $\theta_4$ of 15° with the viewing axis 50. This negative can be made, of course, in the manner illustrated in FIG. 1. Through the wide lens 51 the desired image of the pseudoscopic negtaive 48 and the aspect elements within each picture component thereof, are projected onto the receiving stereographic material 52, which has its lenticulations 53 parallel to the viewing axis 54. Again effective results, generally similar to what has been explained in connection with FIG. 2, are accomplished, yielding a positive stereoscopic print in the lenticular-screened sheet 52. Systems of FIGS. 8A and 8B have some advantages that one or the other of the photographic sheets is made with lenticulations parallel to the side edges thereof, i.e. for convenience in manufacture of lenticulated photographic film which is to be made or cut up into rectangular pieces. Operations of the sort shown in FIG. 8B are also believed to have some further advantage, in minimization of any overall defocusing effects, with respect to the ultimate print 52, and also in minimizing some tendency to so-called vignetting at corners of the ultimate print. However, within total bias angles up to, say, 20°, neither such defocusing nor such vignetting has appeared to be of serious concern, at least where the total viewing angle is kept within a range of say three or four pupillary distances for a suitable viewing distance of, say, two to five feet.

In each of the operations, whether the camera of FIG. 1 or the projection printer of FIG. 2, where an image is projected upon a surface carrying lenticular ridges at a bias angle to the viewing axis, the horizontal, i.e. lateral, opening of the lens is preferably adjusted to achieve as complete "fill" of the lenticulations as possible. Thus it is desirable to image aspect elements or parts of the picture components entirely across the space behind each lenticulation, thereby avoiding an effect of blank lines when the observer of the stereograph (or of a print made from it) moves his head to a lateral distance so as to shift the observation of the picture surface from view through one lenticulation to an angular view through the next adjoining lenticulation. Incomplete fill of the lenticulations causes these blank line effects, which produce some exaggerated "flicks" when the observer shifts his position. This is not wholly objectionable, since ordinarily such shift of position is not needed or desirable, but the stereograph has a more finished and complete appearance with a minimization of flick effect.

If FIG. 5A is taken as a fragmentary vertical view of the face of a single lenticulation bounded by sides 55, 56, arranged at an angle $\theta$ to the viewing axis 57, the observer's eyes can be assumed to be aligned with the horizontal line 58, intersecting the lines 55, 56 at points G, H. In rudimentary theory, the width of the horizontal slit in the camera or projection system is related to the width of the lenticulation, i.e. in the sense that in normal lenticular-screen stereography, with all other dimensions constant, the horizontal width of the lens slit should vary in proportion to the width of the lenticulation if the photographic surface back of the lenticulation is to be filled, i.e. with aspect element images. Referring further to FIG. 5A it will be seen that the distance GH is greater than the perpendicular transverse span $p$ of the lenticulation, specifically in accordance with the expression $$GH = p \sec \theta \qquad (1)$$

Hence at least approximately, the horizontal aperture of the lens, whether for camera or projector, should be lengthened in proportion to the secant of the bias angle of the receiving lenticular screen, with respect to a slit length that would be appropriate (e.g. in accordance with principles expressed in my aforesaid patent) for a screen having truly vertical lenticulations of the same width $p$, parallel to the viewing axis.

It has been found that with larger bias angles, e.g. particularly in the range above 20° or so in the receiving screen, there is some tendency for a vignetting effect to occur. Specifically in regions of at least two opposite corners of the rectangular sheet (either in camera or printer) the effect of the biased lenticulations is to prevent complete fill of the area behind such lenticulations, as corner regions are approached. Hence the picture has an appearance of fading to a blank at these regions, so that the photograph appears to have been vignetted in a manner similar to intentional vignetting operations for portraits or the like where background or detail is shaded or faded out in peripheral areas of the print. While this effect may not be objectionable in some cases, it is ordinarily desirable to avoid it, i.e. by limiting the bias angle of the receiving screen to the minimum, by utilizing as long a lens slit as is feasible for the selected optical system, and by utilizing ridges in the receiving lenticular screen which have a somewhat larger angle of view, or more specifically a somewhat smaller focal ratio, than would be deemed appropriate were the lenticulations arranged without bias angle. Since the vignetting effect can occur both in the camera and the printer, it may to some extent be compounded, but in general within a total range of bias angle up to 15° or 20°, the effect is not usually serious and is not greatly related to the allocation of this total bias angle between the negative and positive stereographic materials. To some extent, the vignetting action is more serious in the projection printing operation than in making the original negatve, but procedure within the preferred ranges herein disclosed, i.e. as to bias angles in either or both of the negative and poistive, has generally been found to avoid difficulties.

A particularly important feature of the invention is that it provides for the production of clear and sharp stereoscopic prints of any desired image ratio on a lenticular print sheet, the term "image ratio" referring to the ratio of size of the print image to the negative picture or object from which projection is made. As will be readily appreciated, the number of lenticulations per inch (i.e. transversely) of the print material need not bear any relation to the number of lenticulations per inch in the negative in order to afford a properly stereographic result; that is to say, there is no problem of registration between lenticulations at opposite ends of the projection path, the projected rays from the lens being in effect a simulation of such projection from a camera lens and being acceptable by a lenticular screen of any fineness or coarseness providing the focal ratio of the screen sufficiently agrees with the desired viewing angle and viewing distance in accordance with known principles. Indeed, if desired, the number of lenticulations per inch on the negative and printing materials may be identical either for one-to-one projection or for greater or smaller image ratios. Where the transparent film body, in which the lenticulations are constituted, is of the same thickness for negative and print, the number of lenticulations per inch may be the same in both if equal focal ratios are desired (e.g. for one-to-one projection) or may be less in the print if the latter is to have a smaller focal ratio for each ridge (i.e. a wider opening) than in the negative.

Another advantage of the present projection printing, in respect to some other modes for printing or copying stereoscopic photographs, is that relatively large amounts of light are accommodated by a lens of large opening, so that normal photographic exposure times can be employed. This permits use of conventional emulsions, both for black and white and color operation, normally without having to operate in time areas of reciprocity law failure.

By way of further illustration, FIGS. 7A, 7B and 7C show highly simplified plan diagrams of projection printing in accordance with the invention, respectively where the image ratio produces a reduced size positive, where the projection is one-to-one, and where an enlarged print is made. Thus in FIG. 7A the projection from the pseudoscopic negative 60 through the wide lens 61 is arranged to yield a reduced size positive 62. In FIG. 7B the optical distances are modified so that the positive 62 is of the same size as the negative 60, while in FIG. 7C an enlarged print 63 is achieved from the negative 60a.

It will be appreciated that the image ratio is governed, as to linear dimensions of the object and image, inversely in accordance with the ratio of the object distance O to the image distance Q, the focal length of the lens in each of these views being approximately indicated by F. As will be understood, the distance of each of the negative object and positive image in one-to-one projection is equal to 2F, where F is, as explained, the the effective focal length of the lens.

As shown in simplified and theoretical manner in FIG. 6, which represents a horizontal section of a lenticulation assumed to be disposed in conventional non-biased position, such lenticulation 65 accepts rays within an angle $\phi'$, i.e. in that a spread of aspect elements within a total viewing angle $\phi'$ between limiting directions 66, 67 is in effect exactly accommodated by the lenticulation. Hence at least theoretically, the lenticulation of any given receiving screen, as in the receiving screens of FIGS. 7A, 7B and 7C should be designed, if possible, for agreement with the angular spread $\phi$ of rays projected from opposite horizontal ends of the lens 61. Since the focal length F of a lenticulation is approximately such as to bring parallel rays to a focus at its rear surface 68 (as explained in my cited patent) the angle of spread expected by the lenticulation, i.e. the angle $\phi'$, is mutually determinable with the focal ratio, i.e. the ratio of F to $p$. With the foregoing factors in mind, it will be seen at once that the design of suitable lenticulation for any selected reducing, enlarging or one-to-one printing system can be readily achieved by simple geometrical determination, it being desirable, for optimum theoretical results with projection on a vertical, non-biased screen, that the acceptance angle of the lenticulation equal the range of viewing angles, i.e. the total angular spread between opposite horizontal ends of the lens. To the extent, of course, that under-fill or over-fill of the lenticulation may be tolerated, departures of this angular relationship are permissible.

As intimated above, the use of a projection lens constituted of two spaced lens assemblies as in FIG. 2 is particularly advantageous, especially where lens assembly 27 is so circumstanced that lens assembly 28 receives rays as is from an object at infinity; the focal ratios and focal lengths of the lenses 27, 28 may then be readily selected for best coordination with the desired image ratio of projection and the focal ratios of the lenticular screens. As also indicated, a larger focal ratio is sometimes desirable in the receiving screen (for best fill), than in the subject screen, i.e. as may be occasioned by the bias angle of the receiving screen, or indeed by the total bias angle between the object or negative screen and that of the print.

It will also be noted, referring again to FIGS. 7A, 7B and 7C, that the length of the slit at the lens, horizontally, is adjusted in accordance with the image ratio, being smaller for a reduced image (FIG. 7A), and greater for an enlargement (FIG. 7C).

The choice of the bias angle $\theta$ for a given lenticular screen, whether in the camera or for the positive print, and likewise the choice of the total bias angle between screens in the projection printing step will generally be limited by considerations such as defocusing effects and loss of stereoscopic properties occasioned both by the biased, elongated nature of deformed point images, and by limitation of the actual range of viewing angles when bias angles become excessive.

With respect to defocusing effects, FIGS. 5A and 5B are related to a single lenticulation considered to have side boundaries 55, 56 and a bias angle $\theta$. As explained in my cited patent, rays intended to produce a single point image, on the photographic surface, of an aspect element can be deemed to reach the lenticulation as a group of parallel rays, spread across a horizontal diameter of the lenticulation and having a given aspect angle to the optical axis of the lenticulation (FIG. 7 of the patent). Consider, for example, three such parallel rays 70, 71 and 72 where the aspect angle is zero, i.e. parallel to the optical axis. If the lenticulation is vertical (with no bias angle) corresponding rays 70', 71' and 72' are brought to a focus at a single point 74 in the rear face 75, as shown in FIG. 4, of the lenticulation 76. However, in the biased lenticulation, ray 71 reaches the center of the rear face 77 at the point 78, but the rays 70 and 72 are directed, by the cylindrical lens of the lenticulation, to points 79 and 80 respectively above and below the horizontal plane 58 in which the rays reach the screen, each being also displaced laterally from a vertical alignment with the point 78, in accordance with the bias angle $\theta$. Hence the image formed by the rays 70, 71, 72 is not a point but is a sloping line 79–80 as shown in FIG. 5A.

In like manner, other sets of parallel rays, representing a point of an aspect element, such as the rays 82, 83, 84 will be similarly defocused and form an image of a sloping line 85 at the rear face 77, parallel to the line 79–80 and of equal length. Thus all of the aspect element points across a horizontal plane 58 will be imaged as lines extending below and above the plane, being bounded by horizontal lines 87, 88. It will be readily seen that this defocusing effect, as concerns rays in a single horizontal plane, is dependent on the bias angle, the vertical distance between lines 87 and 88 decreasing with the latter and being zero when the angle is zero. For small angles $\theta$ this effect is essentially inconsequential, i.e. within a range of 20° or less. The effect, moreover, is reduced to the extent that bundles of rays can be considered to come in a plane biased from the plane 58 by an equal angle $\theta$, but this angular dispersion is necessarily limited by the vertical height of the slit in the camera or projecting lens.

Hence it will be seen that at very large values of $\theta$ and particularly where both screens might be characterized by large angles in the projection operation, the described effect interferes both with definition in the image and particularly with stereoscopic results; for these and other reasons the bias angles should be limited as outlined hereinabove.

It will also be apparent that the range of viewing angles or aspect angles that can be derived from a composite stereograph recorded with a biased lenticular screen is necessarily reduced from the total angular range (i.e. original angle $\phi$) of rays reaching a given lenticulation for the corresponding picture component. That is to say, the lenticulation is a cylindrical lens and has its maximum angular width in a direction perpendicular to the longitudinal axis, so that as viewed along a plane at the angle $\theta$ to such perpendicular line the observable component of the maximum angle $\phi$ is necessarily less than such angle. It may be geometrically shown, as will be apparent from the foregoing, that the useful angle $\phi''$ observable with a lenticulation having a bias angle $\theta$, the width $p$ and a focal length $F_r$ is given by the following expression:

$$\tan \frac{\phi''}{2} = \frac{p \cos \theta}{2F_r} \qquad (2)$$

Thus this useful angle $\phi''$ is twice the angle whose tangent is expressed by the righthand half of the above equation. At the same time, it has also been explained that in order to fill a lenticulation, the slit of the camera or projection lens must be wider, i.e. have a greater length in a horizontal direction, than would proportionally correspond to the perpendicular diameter of such lenticulation. This apparent anomaly is occasioned by geometrical considerations, as will now be apparent, and one effect is that to achieve optimum stereoscopic properties, in a picture projected (either in the camera or the printer) to a biased lenticular screen, the effective aperture of the ridges (relative to their focal length) should be theoretically greater than would otherwise be used. It is found in practice, however, that quite good results can be had with ridges of the same or about the same focal ratio, the ridges of the negative being underfilled and those of the print being precisely filled.

By way of example, where a negative is made (FIG. 1) with a screen 17 having 110 ridges per inch, measured perpendicularly to the ridges, and a bias angle of 7½°, a one-to-one reproduction (FIG. 2) can be conveniently made with a screen 25 (again at a bias angle of 7½°) having 120 ridges per inch, again measured perpendicularly, both screens having the same focal ratio of their lenticulations.

The following is an example of practice of the invention, using a lens, both in the camera (FIG. 1) and the projection printer (FIG. 2), which is constituted of at least 4 elements (preferably a spaced pair of assemblies) having a usefully flat field (as is highly desirable for these operations) with a maximum horizontal aperture of about 10 inches and a focal length of 19½ inches. Each of the screens 17 and 25 was designed with a bias angle of 7½° and having lenticulations of a focal ratio of about $f/3.5$, that is a ratio of $F_r$ to the width $p$ of 3.5. For one-to-one printing in the projection printer, these lenticulations provide a theoretical angle of view of about 21° in the negative and print. In the screens 17 and 25 (for the negative and positive), lenticulations of sizes respectively corresponding to 110 and 120 ridges per inch were employed, as stated above, measured perpendicularly across the ridges in each case. While this example functioned satisfactorily, and afforded clear, sharp prints readily viewable at a minimum distance of about 23 inches and exhibiting good stereoscopic properties over a viewing range of several pupillary distances, it may be desirable for some purposes to use a somewhat smaller angular range of acceptance, i.e. angle $\phi$ in the receiving screen 25. A suitably smaller angle in this respect is obtainable with lenticulations in the latter screen having a focal ratio of $f/4$. It will be appreciated that for reductions or enlargements, as in FIGS. 7A and 7C, corresponding modification of the lenticular screens for the print will be effected, in accordance with principles that will now be readily understood.

An arrangement of some present preference (especially when large numbers of prints or copies thereof are to be made from one negative) is to use a bias angle of 16° in the screen 17 (FIG. 2), and no bias angle in the receiving screen 25.

Experience indicates that although in theory some loss of depth of focus and of picture detail or definition will be occasioned by the operations and systems of the invention, such deficiencies are not generally apparent in prints as made, especially when viewed from a comfortable viewing distance. A print is considered sharp, for example, if the smallest detail falls within a circle of confusion of 2 minutes of arc of visual angle. Following the preferred modes of operation described above, suitably sharp prints are readily attained.

Indeed in composite stereography as in ordinary two dimensional photography, the sharpness and quality of a projection print depend upon the image resolution retained in the successive stages of production. Very desirable three dimensional prints are obtained when the resolving characteristics of each stage are as follows:

Subject—Clear lighting of details with a minimum of deep shadows or glare areas.
Camera lens—Resolve 40 lines per mm. or better.
Negative—Resolve 15 lines per mm. or better.
Printer lens—Resolve 10 lines per mm. or better.
Print—Resolve 3.3 lines per mm. or better.

Although the invention has been described in its special relation to making positive stereoscopic prints from pseudoscopic negatives, the camera and projecting operations, especially the latter, are applicable to other circumstances. For instance, it may be desirable to make pseudoscopic enlargements from stereoscopic prints or negatives, e.g. as in the course of making further enlarged reproductions; in such event two successive projection printing operations may be employed. Likewise, the projection stage may be used for direct viewing, e.g. as in projecting from a pseudoscopic positive onto a viewing screen (having a diffusing or ground-glass type of surface) which is characterized by lenticular ridges on the side receiving the projected rays and which also has lenticular ridges on its opposite side for viewing by an audience. The stereograph from which projection is made may be established electronically or by other than light radiation, and its illumination for projection may be effected in various ways, as by fluorescence of the picture surface; the projected stereograph may likewise be sensed by electronic or other means, as distinguished from photographic reproduction or direct viewing. These and other projecting operations in the field of composite stereography are readily adaptable to utilize the steps and arrangements described herein for effective results without undesirable interference patterns in the received image.

The term viewing axis as herein used in reference to a picture or image (or subject), means a line or direction in the plane of such picture or image, about which the different aspects of viewing are established, such line being in effect the apex, or parallel to the apex, of the solid angle within which the range of aspects is observed or seen. Thus for example, for three dimensional effect in a stereograph viewed by a pair of eyes in horizontal alignment, the viewing axis is a vertical line or direction in the plane of the stereograph.

It is to be understood that the invention is not limited to the specific structures and steps hereinabove described but may be carried out in other ways wtihout departure from its spirit.

I claim:

1. A method of projecting, from a composite stereograph which comprises a picture and is divided into picture components each subdivided into aspect elements, and which is arranged for a predetermined viewing axis, an image that constitutes a second composite stereograph which comprises an image of the picture and is divided into picture components each subdivided into aspect elements, and which is arranged to have a like viewing axis, comprising: associating with said first stereograph and with a surface to receive said image, respective first and second lenticular screens each comprising a multiplicity of parallel, linear, component-resolving lenticular ridges; illuminating the first stereograph; and optically projecting from said first stereograph, through its associated screen, then through an intermediate slit crosswise of the viewing axis of said first stereograph and onto said surface through the screen associated therewith, an image of said first stereograph, while preventing appreciable extraneous patterns in said image as viewed through the last-mentioned screen, by disposing said screens so that the ridges of one extend at an acute angle, selected in the range of 10° to 60°, to the ridges of the other while maintaining the ridges of each at an angle of not more than 45° to the viewing axis of the first stereograph, to establish said image on said surface with a viewing axis substantially aligned with said axis of the first stereograph.

2. A method as defined in claim 1, wherein the said angle maintained between the ridges of one screen and the ridges of the other is selected in the range of 12° to 50°, and the angle of the ridges of each to the first viewing axis is maintained at not more than 35°.

3. A method as defined in claim 1, wherein the said angle maintained between the ridges of one screen and the ridges of the other is selected in the range of 12° to 30°, and the angle of the ridges of each to the first viewing axis is maintained at not more than 25°.

4. A method of making a stereographic print in a photographic procedure wherein a composite stereograph is made by exposing a sensitized surface through a lenticular screen associated with such surface, to an image projected thereon over a range of viewing angles, said image being projected to have a predetermined viewing axis, and wherein said screen comprises a multiplicity of parallel, linear component-resolving lenticular ridges, comprising: illuminating said stereograph, projecting from said stereograph through its said screen associated with its surface, and through a second lenticular screen onto a second sensitized surface with which said second screen is associated, an image of said composite stereograph, said projection of said last-mentioned image being optically effected to produce said image on said second surface to constitute a second composite stereograph having a predetermined viewing axis parallel with such axis of the first stereograph, said second screen comprising a multiplicity of parallel, linear, component-resolving lenticular ridges, and preventing appreciable extraneous patterns in said last-mentioned image, as viewed through the second screen, by disposing said first stereograph and its screen, and said second screen, during said last-mentioned projection, so that the ridges of one screen extend at an acute angle, selected in the range of 10° to 60°, to the ridges of the other, while maintaining each screen at an angle of not more than 45° to the aforesaid parallel viewing axes.

5. A method as defined in claim 4, in which the first-mentioned stereograph is produced to be pseudoscopic, and in which the projection of the last-mentioned image is effected through the second lenticular screen to produce said second stereograph in stereoscopic form, said screens being maintained so that the first-mentioned acute angle is selected in the range of 12° to 50°, and each screen being maintained at an angle of not more than 35° to the parallel viewing axes.

6. A method as defined in claim 5, in which said screens are maintained so that the first-mentioned acute angle is not more than 25°, and each screen is maintained at an angle of not more than 20° to the parallel viewing axes.

7. A method as defined in claim 5, in which said angle of not more than about 15° to the parallel viewing screens are maintained so that the first-mentioned acute angle is about 15°, and each screen is maintained at an axes.

8. A method of making a stereographic positive print in a photographic procedure wherein a pseudoscopic composite stereograph consisting of a photographic negative is made by exposing a sensitized surface, through a lenticular screen associated with such surface, to an image of a three-dimensional object projected from such object by camera projecting means having an angular range of viewing the object sufficient to accommodate more than one pupillary distance in a direction transverse of said screen, said image being projected to have a predetermined viewing axis, and wherein said screen comprises a multiplicity of parallel, linear component-resolving lenticular ridges at a predetermined angle to said viewing axis, comprising: illuminating the said pseudoscopic stereograph of said photographic negative, projecting from said negative having said screen associated with its surface, through said screen, and through a second lenticular screen onto a second sensitized surface with which said second screen is associated, an image of said pseudoscopic composite stereograph, said projection of said last-mentioned image being optically effected to produce said last-mentioned image on said second surface to constitute a stereoscopic composite stereograph having a predetermined viewing axis parallel with such axis of the first stereograph, said second screen comprising a multiplicity of parallel, linear, component-resolving lenticular ridges, and preventing appreciable extraneous patterns in said last-mentioned image, as viewed through the second screen, by disposing said first stereograph and its screen, and said second screen, during said last-mentioned projection, so that the ridges of one screen extend at an acute angle, selected in the range of 10° to 60°, to the ridges of the other, while maintaining each screen at an angle of not more than 45° to the aforesaid parallel viewing axes.

9. A method as defined in claim 8, in which said screens are maintained so that the first-mentioned acute angle is about 15° and so that each screen is maintained at an angle of about 7½° to the parallel viewing axes.

10. Apparatus for projection photographic printing of composite stereographs, comprising a surface carrying a composite stereograph divided into parallel, linear picture components each subdivided into linear aspect elements parallel to the picture components, said stereograph having a predetermined viewing axis, a lenticular screen associated with said stereograph comprising a multiplicity of parallel, linear component-resolving lenticular ridges, means for illuminating said stereograph, an image-receiving surface disposed to receive an image of the first-mentioned stereograph optically projected therefrom, said last-mentioned surface having an associated lenticular screen therewith, comprising a multiplicity of parallel, linear, component-resolving lenticular ridges, and optical projecting means intermediate the screen of the aforesaid stereograph and the screen of said image-receiving surface, for projecting light emanating from said stereograph through its screen, as an image on said receiving surface, as modified by the second-mentioned screen associated with said receiving surface to constitute said image as a second composite stereograph adapted to exhibit stereographic characteristics upon observation of same through said last-mentioned screen, said surface and projecting means being arranged to establish said image with a viewing axis parallel to the viewing axis of the first-mentioned stereograph, said first and second-mentioned screens being disposed with their respective lenticular ridges at an acute angle to each other, selected in the range of 10° to 60°, the ridges of each screen being disposed at an angle of not more than 45° to the aforesaid viewing axis of the first-mentioned stereograph.

11. Apparatus as defined in claim 10, in which the projecting means comprises lens means having a slit-shaped aperture which extends transversely to the viewing axis of the first-mentioned stereograph and has a dimension in the direction of said axis which is small relative to the length of the aperture transverse of the said axis.

12. Apparatus as defined in claim 10, in which the acute angle between the ridges of the said screens is selected in the range of 12° to 25°, each of said screens having its ridges disposed not more than 20° from the viewing axis of the first-mentioned stereograph.

13. Apparatus as defined in claim 10, in which the angular difference between the ridges of the lenticular screens is about 15°, and each screen has its ridges disposed not more than about 15° from the viewing axis of the first-mentioned stereograph.

14. Apparatus as defined in claim 10, in which the first-mentioned lenticular screen is arranged with its ridges at an angle of 12° to 20° to the viewing axis of the first-mentioned stereograph, the screen of the receiving surface having its ridges substantially parallel with the viewing axis of the first-mentioned stereograph.

15. A method of projecting images, to form a composite stereographic view, of illuminated aspect elements of picture components of a subject composite stereograph, said aspect elements and picture components of the subject stereograph being linear and parallel to each other and being established in a first surface and arranged to form a picture having a predetermined reviewing axis and said images being projected on a second surface to make up linear, parallel, picture components thereon for forming said composite stereographic view of said picture on said second surface having a viewing axis parallel to said predetermined viewing axis, comprising: associating with said first and second surfaces, and in the path of light from said first surface to said second surface, respective first and second optical component-resolving screens, each screen comprising a multiplicity of parallel, linear, optical elements each adapted to resolve light rays through a corresponding linear component area into a plurality of aspects differentiated in angular direction; and optically projecting from said first surface, through its associated first screen, and then by optical, focussed convergence of light rays, onto said second surface through the second screen associated therewith, the aforesaid images of aspect elements of the first surface, while preventing appreciable extraneous patterns in said composite stereographic view to be formed by said images on said second surface, by disposing said screens so that the linear, optical elements of one extend at an acute angle, selected in the range of 10° to 60°, to the linear, optical elements of the other while maintaining the linear, optical elements of each at an angle of not more than 45° to the predetermined viewing axis of said subject stereograph.

References Cited

UNITED STATES PATENTS

| | | | |
|---|---|---|---|
| 1,883,290 | 10/1932 | Ives | 88—24 |
| 1,883,291 | 10/1932 | Ives | 88—24 |
| 1,916,320 | 7/1933 | Ives | 88—24 |
| 2,562,077 | 7/1951 | Winnek | 88—29 |
| 2,661,651 | 12/1953 | Stipek | 88—24 X |
| 3,225,651 | 12/1965 | Clay | 88—24 |

NORTON ANSHER, *Primary Examiner.*

R. A. WINTERCORN, *Assistant Examiner.*

PO-1050
(5/69)

UNITED STATES PATENT OFFICE
CERTIFICATE OF CORRECTION

Patent No. 3,409,351          Dated November 5, 1968

Inventor(s)      Douglas F. Winnek

It is certified that error appears in the above-identified patent and that said Letters Patent are hereby corrected as shown below:

Column 7, line 26, for "apropriate" read -- appropriate --.
Column 9, line 4, for "medium" read -- minimum --; column 9, line 34, for "anle" read -- angle --. Column 10, line 60, for "negatve" read -- negative --. Column 11, line 44, cancel "the" [first occurrence]. Column 15, line 72, cancel "angle of not more than about 15° to the parallel viewing"; column 15, line 75, before "axes." insert -- angle of not more than about 15° to the parallel viewing --. Column 17, line 25, for "reviewing" read -- viewing --.

SIGNED AND
SEALED
APR 28 1970

(SEAL)
Attest:

Edward M. Fletcher, Jr.
Attesting Officer

WILLIAM E. SCHUYLER, JR.
Commissioner of Patents